United States Patent
Hayashi

(10) Patent No.: US 9,237,260 B2
(45) Date of Patent: *Jan. 12, 2016

(54) IMAGING APPARATUS, PHOTOGRAPHIC LENS UNIT, AND IMAGING UNIT HAVING AN ABERRATION CONTROL ELEMENT FOR GENERATING A PREDETERMINED ABERRATION

(71) Applicant: KYOCERA CORPORATION, Kyoto (JP)

(72) Inventor: Yusuke Hayashi, Suginami-ku (JP)

(73) Assignee: KYOCERA Corporation, Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/399,024

(22) PCT Filed: May 16, 2013

(86) PCT No.: PCT/JP2013/003115
§ 371 (c)(1),
(2) Date: Nov. 5, 2014

(87) PCT Pub. No.: WO2013/172030
PCT Pub. Date: Nov. 21, 2013

(65) Prior Publication Data
US 2015/0077589 A1     Mar. 19, 2015

(30) Foreign Application Priority Data
May 16, 2012 (JP) .................... 2012-112583

(51) Int. Cl.
*H04N 5/225* (2006.01)
*H04N 5/217* (2011.01)
(Continued)

(52) U.S. Cl.
CPC ............... *H04N 5/217* (2013.01); *G02B 13/00* (2013.01); *G02B 27/0025* (2013.01); *H04N 5/225* (2013.01); *H04N 5/232* (2013.01); *H04N 5/243* (2013.01)

(58) Field of Classification Search
CPC ............................ G02B 27/0025; H04N 5/217
See application file for complete search history.

(56) References Cited

U.S. PATENT DOCUMENTS 5,748,371 A     5/1998   Cathey, Jr. et al.
2009/0128665 A1  5/2009   Yoneyama
(Continued)

FOREIGN PATENT DOCUMENTS

JP    2003-235794 A    8/2003
JP    2009-122514 A    6/2009
(Continued)

OTHER PUBLICATIONS

International Search Report; PCT/JP2013/003115; Aug. 27, 2013.
(Continued)

*Primary Examiner* — Gary C Vieaux
(74) *Attorney, Agent, or Firm* — Studebaker & Brackett PC

(57) ABSTRACT

An imaging apparatus includes a photographic optical system, an image sensor, and an image processing unit. The system includes an aberration control element for generating a predetermined aberration. The system forms an optical image. The image sensor generates an image signal corresponding to the image. The processing unit processes the image signal to improve image characteristics degraded based on the predetermined aberration. The aberration control element, at a first spatial frequency less than a Nyquist frequency of the image sensor, sets a response of a system optical transfer function to a reducible maximum value. The aberration control element positions a field distance of a maximum pupil height of a spherical aberration curve of the system, and a field distance of an inflection point proximate to the maximum pupil height, on either a plus side or a minus side with respect to a field distance of the pupil height of zero.

9 Claims, 7 Drawing Sheets

(51) Int. Cl.
*G02B 13/00* (2006.01)
*H04N 5/232* (2006.01)
*G02B 27/00* (2006.01)
*H04N 5/243* (2006.01)

(56) References Cited

U.S. PATENT DOCUMENTS

2009/0128668 A1 5/2009 Yoneyama
2010/0053361 A1 3/2010 Sugita et al.
2010/0302412 A1 12/2010 Hayashi et al.
2012/0249843 A1 10/2012 Hayashi

FOREIGN PATENT DOCUMENTS

| | | |
|---|---|---|
| JP | 2009-124569 A | 6/2009 |
| JP | 2010-079238 A | 4/2010 |
| JP | 2011-151448 A | 8/2011 |
| JP | 2012-217090 A | 11/2012 |
| WO | 2009/069752 A1 | 6/2009 |

OTHER PUBLICATIONS

Written Opinion of the International Searching Authority; PCT/JP2013/003115; Aug. 27, 2013; with concise explanation.

IMAGING APPARATUS, PHOTOGRAPHIC LENS UNIT, AND IMAGING UNIT HAVING AN ABERRATION CONTROL ELEMENT FOR GENERATING A PREDETERMINED ABERRATION

CROSS REFERENCE TO RELATED APPLICATION

This application claims priority to and the benefit of Japanese Patent Application No. 2012-112583 filed on May 16, 2012, the entire contents of which are incorporated herein by reference.

TECHNICAL FIELD

The present invention relates to an imaging apparatus for allowing an extension of a depth of field, and also to a photographic lens unit and an imaging unit.

BACKGROUND ART

Imaging apparatuses such as a camera and a video camera have been desired to capture a less-blur image of various subjects distributed in a wide range of a distance from a photographic optical system. In other words, it has been desired to extend a depth of field of the photographic optical system. Although adjustment of an aperture to increase an F value allows the extension of the depth of field, the increase in the F value causes lack of light of an optical image of the subject to be received on the light receiving surface. Therefore, it is necessary to slow down a shutter speed or to increase an ISO sensitivity of a film or an area sensor. However, slowing down the shutter speed makes it difficult to capture a moving subject. Also, there has been a problem that the increase in the ISO sensitivity causes an increase in noise generated in a captured image.

As such, there has been proposed a method of debluring, by means of a phase mask, by regularly distributing light beams such that a response of an optical transfer function of the photographic optical system becomes substantially insensitive to a wide range of a subject distance and carrying out deconvolution processing on a captured distributed image (see Patent Document 1 and Patent Document 2). According to the invention described in Patent Document 1, blur occurs in the image of a subject positioned at the subject distance within the above range. However, since the light beams are regularly distributed, restoration processing allows a reduction in blur of the subject positioned at various subject distances and the depth of field may be extended.

However, according to the inventions described in Patent Document 1 and Patent Document 2, the response of the optical transfer function of the photographic optical system using the phase mask is low overall. Therefore, there has been a problem that the noise increases when the restoration processing is carried out in order to satisfactory reduce blur.

RELATED ART DOCUMENTS

Patent Documents

Patent Document 1: U.S. Pat. No. 5,748,371
Patent Document 2: Japanese Patent Application Laid-Open Publication No. 2003-235794

SUMMARY OF INVENTION

Technical Problem

Accordingly, an object of the present invention in view of the above problem is to provide an imaging apparatus that reduces noise generated in an image from which blur is eliminated by carrying out image processing on a distributed image captured by regularly distributing light beams of an optical image of a subject, and also to provide a photographic lens unit and an imaging unit.

Solution to Problem

In order to solve the above problem, an imaging apparatus according to a first aspect of the present invention includes:
  a photographic optical system having an aberration control element for generating a predetermined aberration, for forming an optical image;
  an image sensor for generating an image signal corresponding to the optical image; and
  an image processing unit for carrying out, based on the predetermined aberration, image processing on the image signal in order to improve image characteristics having degraded due to the predetermined aberration, wherein
  the aberration control element sets a response of an optical transfer function to at least a predetermined subject distance in the photographic optical system to be zero at a first spatial frequency below Nyquist frequency of the image sensor and positions both a field distance of a maximum pupil height of a spherical aberration curve of the photographic optical system and a field distance of an inflection point proximate to the maximum pupil height on either a plus side or a minus side with respect to a field distance of the pupil height of zero.

Preferably, a second aspect of the present invention is the imaging apparatus, wherein
  the aberration control element improves a response of the optical transfer function in a first band having a second spatial frequency lower than a first spatial frequency as a maximum value to be better than a response of a reference optical transfer function larger than zero in a range from zero to the Nyquist frequency.

Preferably, a third aspect of the present invention is the imaging apparatus, wherein
  at a spatial frequency satisfying at least one of a spatial frequency smaller then a spatial frequency at which the response becomes zero to a first subject distance where the response of the optical transfer function becomes zero and a spatial frequency smaller than the Nyquist frequency with respect to subject distances other than the first subject distance, the aberration control element reduces the response of the optical transfer function in association with an increase in the spatial frequency.

Preferably, a fourth aspect of the present invention is the imaging apparatus, wherein
  the aberration control element provides the photographic optical system with characteristics having two peak positions of a subject distance optical transfer function at any frequency in a second band having a third spatial frequency less than the first spatial frequency as a maximum value.

Preferably, a fifth aspect of the present invention is the imaging apparatus, wherein the aberration control element moves the peak positions of the response of the subject distance optical transfer function based on the spatial frequency.

Preferably, a sixth aspect of the present invention is the imaging apparatus, wherein
the aberration control element moves the peak positions of the subject distance optical transfer function further to a short distance side as the spatial frequency becomes lower.

Preferably, a seventh aspect of the present invention is the imaging apparatus, wherein
the aberration control element includes a rotationally symmetrical surface.

In order to solve the above problem, a photographic lens unit according to an eighth aspect of the present invention removably attached to an imaging body including an image sensor for generating an image signal corresponding to an optical image formed on a light receiving plane and an image processing unit for carrying out image processing on the image signal, the photographic lens unit includes:
a photographic optical system having an aberration control element for generating a predetermined aberration, for forming an optical image;
a memory for storing corresponding information that is at least one of information about the predetermined aberration and information associated with the predetermined aberration; and
an output unit for outputting the corresponding information, wherein
the aberration control element sets a response of an optical transfer function to at least a predetermined subject distance of the photographic optical system to be zero at a first spatial frequency below Nyquist frequency of the image sensor and positions both a field distance of a maximum pupil height of a spherical aberration curve of the photographic optical system and a field distance of an inflection point proximate to the maximum pupil height on either a plus side or a minus side with respect to a field distance of the pupil height of zero, and
the image processing unit carries out the image processing on the image signal based on the predetermined aberration defined by the corresponding information in order to improve image characteristics having degraded due to the predetermined aberration.

In order to solve the above problem, an imaging unit according to a ninth aspect of the present invention is an imaging unit removably attached to an image processing apparatus, including:
an image sensor for generating an image signal corresponding to an optical image formed on a light receiving surface;
a photographic optical system having an aberration control element for generating a predetermined aberration, for forming an optical image;
a memory for storing corresponding information that is at least one of information about the predetermined aberration and information associated with the predetermined aberration; and
an output unit for outputting the corresponding information, wherein
the aberration control element sets a response of an optical transfer function to at least a predetermined subject distance of the photographic optical system to be zero at a first spatial frequency below Nyquist frequency of the image sensor and positions both a field distance of a maximum pupil height of a spherical aberration curve of the photographic optical system and a field distance of an inflection point proximate to the maximum pupil height on either a plus side or a minus side with respect to a field distance of the pupil height of zero, and
the image processing unit carries out the image processing on the image signal based on the predetermined aberration defined by the corresponding information in order to improve image characteristics having degraded due to the predetermined aberration.

Effect of the Invention

According to the imaging apparatus of the present invention configured as distributed above, noise may be reduced in a captured image of a subject having regularly disposed light beams from which blur is reduced.

DESCRIPTION OF EMBODIMENT

Hereinafter, an embodiment of a photographic lens unit and an imaging apparatus applying the present invention will be described with reference to the accompanying drawings.

Figure 1:
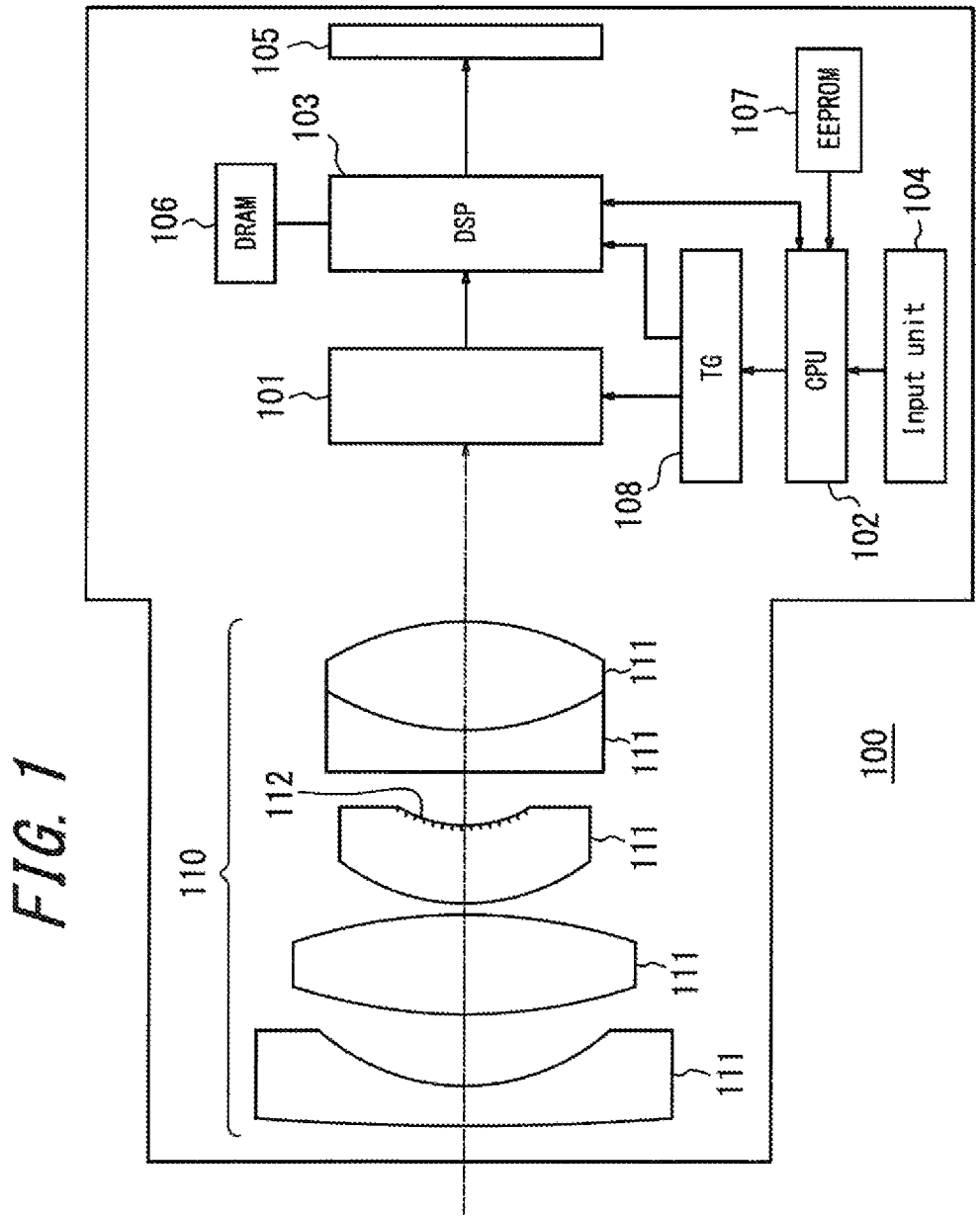
FIG. 1 is a block diagram illustrating an optical configuration and a schematic electric configuration of a digital camera serving as an imaging apparatus according to one embodiment of the present invention.

FIG. 1 is a block diagram illustrating an optical configuration and a schematic electric configuration of a digital camera serving as the imaging apparatus according to one embodiment of the present invention.

A digital camera 100 includes a photographic optical system 110, an image sensor 101, a CPU 102, a DSP 103, an input unit 104, a monitor 105 and the like.

The photographic optical system 110 includes a plurality of lenses 111. One of the lenses 111 includes an aberration control surface 112 formed on an inner surface thereof for generating a spherical aberration of the photographic optical system 111. Note that, in order to satisfy optical characteristics described below, the aberration control surface 112 is formed to be rotationally symmetrical with respect to an optical axis. The photographic optical system 110 images a subject to be captured and forms a subject image on a light receiving surface of the photographic optical system 110.

The image sensor 101 is, for example, a CCD or a CMOS area sensor and generates an image signal corresponding to the subject image formed on the light receiving surface. The image signal thus generated, at AFE (not illustrated), is subjected to CDS processing, A/D conversion processing and the like and converted into a digital signal, which is then transmitted to the DSP 103. The DSP 103 uses a DRAM 106 as a work memory and carries out predetermined signal processing on the image signal received. The image signal having been subjected to the predetermined signal processing is transmitted to the monitor 105, which displays an optical image corresponding to the image signal. Also, the image signal having been subjected to the predetermined signal processing may be stored in a storage medium (not illustrated) detachable from the CPU 102 via the CPU 102.

Note that the predetermined signal processing includes restoration processing. A distributed image, which is the subject image formed by the photographic optical system 110, is an optical image having an extended depth of focus due to a function of the aberration control surface 112 and also having blur. In order to carry out the restoration processing, a filter for correcting the spherical aberration is transmitted from an EEPROM 107 to the DSP 103 via the CPU 102. Note that the filter is one for restoring blur according to preliminarily measured PSF (Point Spread Function) specific to the photographic optical system 110, that is, such as Wiener filter predetermined according to the degree of blur. The DSP 103, by using the filter, carries out deconvolution processing on the image signal, and thus a distributed image with less blur is generated.

Timings of various operations of the image sensor 101 and the DSP 103 are controlled by a timing generator (TG) 108. The TG 108 also, based on the control of the CPU 102, controls timings of operations of the image sensor 101 and the DSP 103. Further, the CPU 102 also controls, in addition to the TG 108, operations of various components of the digital camera 100. The CPU 102 is connected to the input unit 104 which includes an input device such as a button (not illustrated) or a dial (not illustrated). Based on an input operation to the input unit 104 by a user, the CPU 102 controls the operation of each component. The CPU 102 is connected to the EEPROM 107. In addition to the aforementioned filter, information necessary for execution of various functions of the digital camera 100 is stored in the EEPROM 107 to be retrieved by the CPU 102 as necessary.

Next, the optical characteristics of the photographic optical system 110 caused by the aberration control surface 112 will be described in detail. That is, the aberration control surface 112 is designed and formed in such a manner that the photographic optical system 110 has the optical characteristics described below.

Figure 2:
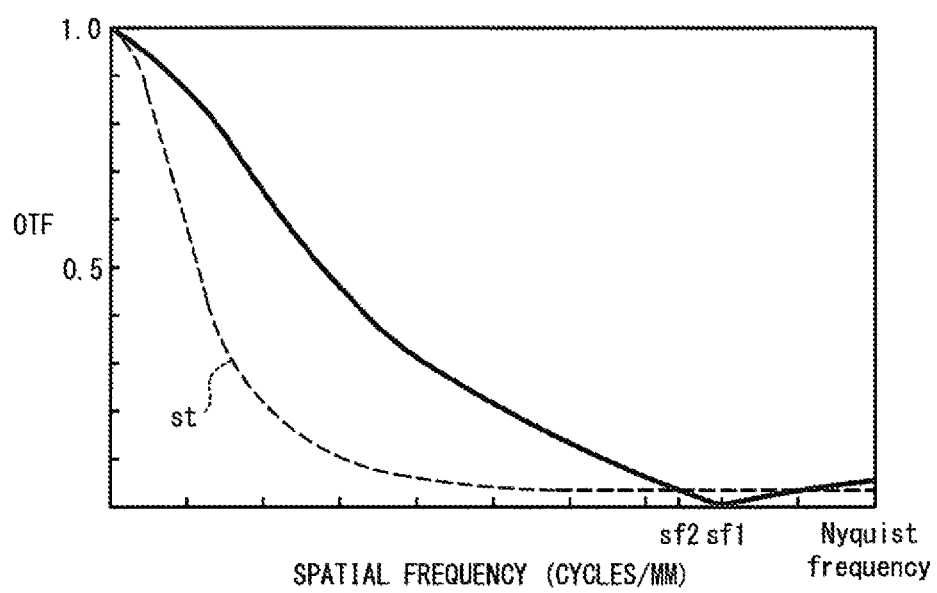
FIG. 2 is a graph illustrating a response of an optical transfer function with respect to a spatial frequency at an image formation position of a photographic optical system.

As illustrated in FIG. 2, when the spatial frequency is at a first frequency sf1, a response of an optical transfer function, i.e., OTF to a desired subject distance is zero. Note that the first frequency is set to be a value lower than Nyquist frequency ($=1/(2 \times p)$, p represents a pitch of pixels of the image sensor 101) of the image sensor 101 and higher than a required frequency, which is a spatial frequency corresponding to resolution required for a captured image.

When the response of OTF is zero, an original image may not be restored later. Therefore, the photographic optical system has conventionally been designed such that the response of the OTF of the photographic optical system exceeds zero over an entire range of the spatial frequency from zero to the Nyquist frequency. However, since the response of the OTF cannot be kept high over the entire range, the response of the OTF has generally been low overall.

According to the present embodiment, on the other hand, the aberration control surface 112 is formed in such a manner that the response of the OTF at the first frequency sf1 is intentionally set to be zero, and thereby the response of the OTF in a first band having a second frequency (see "sf2" in FIG. 2) less than the first frequency sf1 as an upper limit becomes larger than a response of a reference OTF (see "st" in FIG. 2). Note that the reference OTF is an OTF of the photographic optical system 110 having the same requirements as the present embodiment other than the requirement that the response exceeds zero over the entire range of the spatial frequency. The higher the response of the OTF is, the lower the degree of blur in the distributed image is, and thus a load of the deconvolution processing is reduced. Reduction in the load of the deconvolution processing allows prevention of an increase in noise generated in a restored image.

Although in an example of FIG. 2 the response of the OTF to the desired subject distance is zero, the response of the OTF to another subject distance may be zero. (Preferably, the subject distance where the response of the OTF between the required frequency and the Nyquist frequency becomes zero falls in a wide range. However, when, for example, a subject distance assumed to be frequently imaged is set to the desired subject distance and the response of the OTF at least to the desired subject distance becomes zero, an effect of the present invention may be obtained.)

Also, the aberration control surface 112 may be formed in such a manner that, in a band higher than the first frequency sf1, the response of the OTF to the desired subject distance becomes lower than the response of the reference OTF. Satisfying such characteristics allows a further improvement in the response of the OTF in the range of the spatial frequency less than the first frequency sf1.

According to the present embodiment, also, between zero and the first spatial frequency sf1, the response of the OTF decreases as the spatial frequency becomes higher. In a manner different from the present embodiment, a peak value provided to the response of the OTF in a graph of the OTF with respect to the spatial frequency allows a reduction in blur occurred in the subject image at a particular frequency. In such a configuration, however, when the subject image at a frequency other than the particular frequency is imaged, a false image is generated. According to the present embodiment, the response of the OTF is reduced in association with an increase in the spatial frequency in a range less than the first spatial frequency sf1 as described above, thereby preventing generation of a peak of the response and suppressing the generation of the false image.

Note that, as mentioned above, the response of the OTF does not become zero to all subject distances; there are some subject distances where the response of the OTF does not become zero. For such subject distances, the response of the OTF is reduced in association with an increase in the spatial frequency in a range less than the Nyquist frequency, thereby preventing the generation of the peak of the response.

Figure 3:
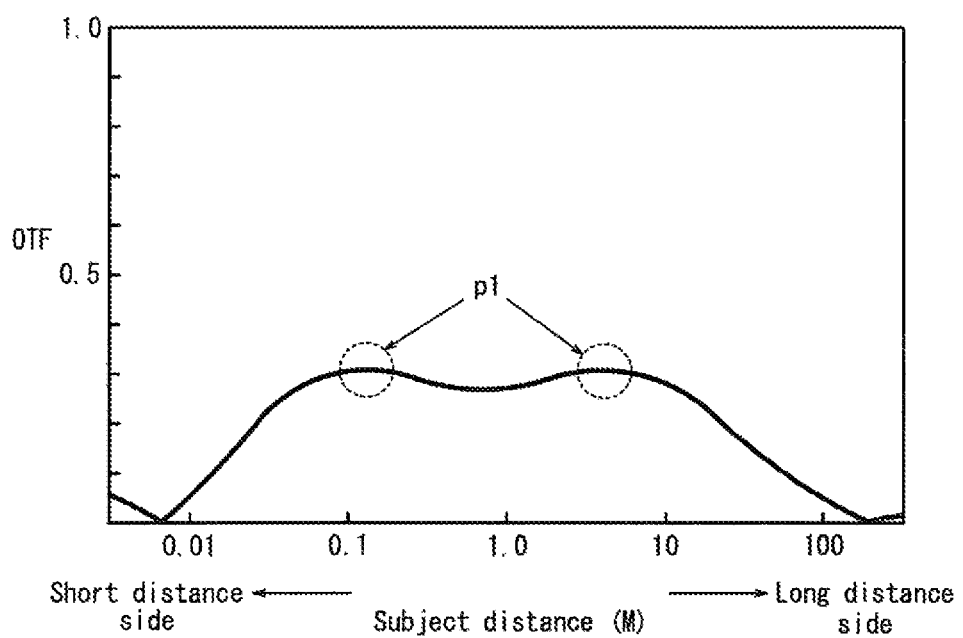
FIG. 3 is a graph illustrating a response of a subject distance OTF of the photographic optical system at a given spatial frequency in a second band.

Also, the photographic optical system 110, as indicated by the subject distance OTF in FIG. 3, has two peaks (see p1) at a given frequency in a second band having a third spatial frequency lower than the first spatial frequency sf1 as a maximum value, and an image formation position locates between the two peaks. Having two peaks at the third spatial frequency in this manner may allow prevention of sharp decrease in the OTF at the image formation position. Although as described below the position of the peak of the subject distance OTF changes according to the spatial frequency, it is preferable to avoid the sharp decrease in the OTF at the image formation position, because a subject positioned on a surface of a substance corresponding to the image formation position is considered as a main subject, and noise in a reproduced image is preferably reduced as much as possible. Note that, when there is a band of the spatial frequency somewhere in which the subject distance OTF has two peaks, the sharp decrease in the OTF at the image formation position in another band may be prevented, and thus it is not necessary for the subject distance OTF to have two peaks in the entire band.

Figure 4:
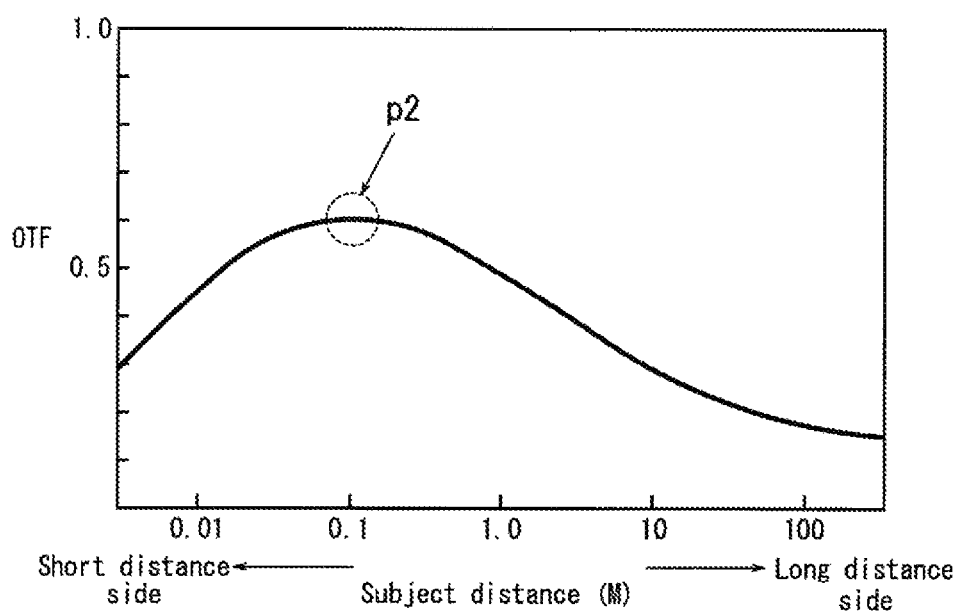
FIG. 4 is a graph illustrating a response of the subject distance OTF of the photographic optical system at a spatial frequency having a peak value on a short distance side.
Figure 5:
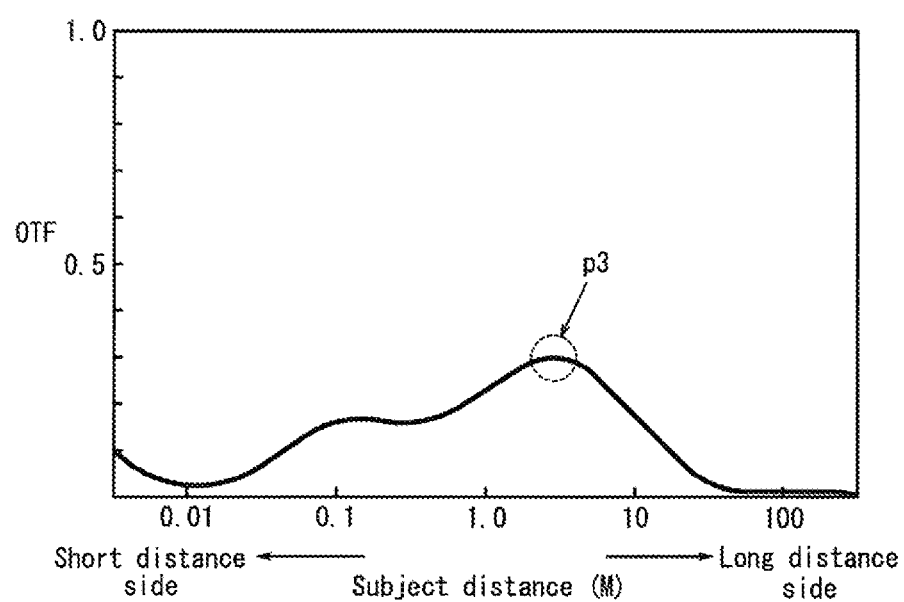
FIG. 5 is a graph illustrating a response of the subject distance OTF of the photographic optical system at a spatial frequency higher than the spatial frequency of the subject distance OTF illustrated in FIG. 4.

Further, in the photographic optical system 110, as indicated by the subject distance OTF of FIG. 4 and FIG. 5, as the spatial frequency becomes lower, the peak position of the subject distance OTF moves further to a short distance side (see "p2" in FIG. 4 and "p3" in FIG. 5).

Generally, as the distance to the subject is shorter, the spatial frequency of the optical image is lower, and thus as the distance to the subject is longer, the spatial frequency of the optical image is higher. Therefore, when the spatial frequency is low, providing the peak value to the subject distance OTF on the short distance side (see FIG. 4) allows a reduction in noise generated in the reproduced image of an optical image with a low spatial frequency positioned in a short distance. Also, when the spatial frequency is high, providing the peak value to the subject distance OTF on the long distance side (see FIG. 5) allows a reduction in noise generated in the reproduced image of an optical image with a high spatial frequency positioned in a long distance.

Figure 6:
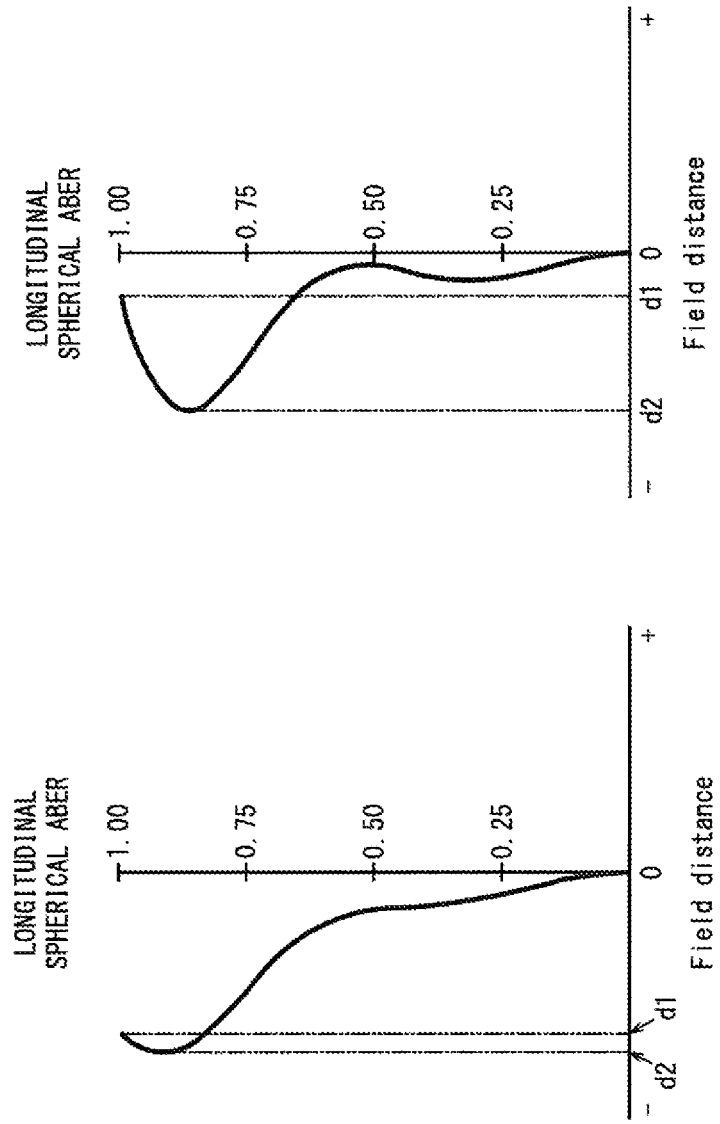
FIG. 6 are diagrams illustrating a spherical aberration of the photographic optical system.

The photographic optical system 110 has an inflection point of the spherical aberration curve. On the spherical aberration curve, also, both a field distance of the maximum pupil height (hereinafter, referred to as a "first field distance") and a field distance of an inflection point proximate to the maximum pupil height (hereinafter, referred to as a "second field distance) are positioned on either a plus side or a minus side with respect to a field distance of the pupil height of zero (hereinafter, referred to as a "reference field distance"). As illustrated in FIGS. 6(a) and 6(b), for example, both the first field distance (see the reference numeral "d1") and the second field distance (see the reference numeral "d2") are positioned on the minus side with reference to the reference field distance (i.e., zero).

As described above, although causing the spherical aberration allows the formation of the distributed image with an extended depth of field on the light receiving surface of the image sensor 101, the OTF may sharply decrease. As such, forming the aberration control surface 112 having the inflection point allows avoiding the sharp decrease in the OTF. Further, positioning both the first field distance and the second field distance on the spherical aberration curve on either the plus side or the minus side with respect to the reference field distance allows an improvement in the OTF.

According to the imaging apparatus of the present embodiment configured as described above, the OTF at the first spatial frequency sf1 is set to be zero, and thus the distributed image for reducing the noise generated in the reproduced image that is obtained by carrying out the deconvolution processing on the distributed image may be formed on the light receiving surface. According to the imaging apparatus of the present embodiment, also, both the first field distance and the second field distance are positioned on either the plus side or the minus side with respect to the reference field distance, and thus the OTF may be improved and, as a result, the noise generated in the reproduced image may be further reduced.

Although the present invention has been described based on the figures and the embodiment, it is to be understood that various modifications and changes may be implemented based on the present disclosure by those who are ordinarily skilled in the art. Accordingly, such modifications and changes are included in the scope of the present invention.

Figure 7:
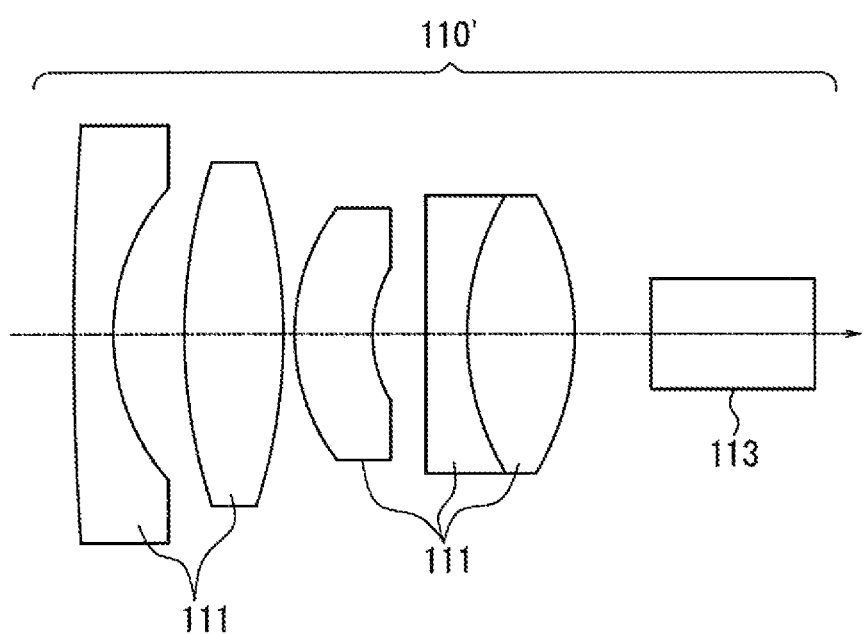
FIG. 7 is an example of a variation of the photographic optical system having an aberration control element instead of forming an aberration control surface.

For example, although according to the present embodiment the aberration control surface 112 is formed on an inner surface of the lens 111 included in the photographic optical system 110, an aberration control element 113 as illustrated in FIG. 7 for causing the optical characteristics as described above in an entire photographic optical system 110' may be included therein.

Also, although in the present embodiment the peak of the subject distance OTF moves closer to the short distance side as the spatial frequency becomes lower, the peak of the subject distance OTF may move simply based on the spatial frequency. Some imaging apparatus applying the present invention may have a main subject fixed in a long distance or in a short distance and the spatial frequency of such a main subject may be included in a particular band. Therefore, the peak position may be determined based on the spatial frequency of the main subject according to the distance.

Also, although the imaging apparatus of the present embodiment is configured to be applied to the digital camera 100, the imaging apparatus of the present embodiment is applicable also to, for example, other imaging devices such as a digital video camera, a camera-equipped mobile phone and the like.

Also, although the present invention is configured to be applied to the imaging apparatus integrally including the photographic optical system 110, the image sensor 101, and the DSP 103, the present invention is applicable also to an imaging lens (the photographic lens unit) detachable from a camera body such as a digital single-lens reflex camera. In applying the present invention to the photographic lens unit, a lens memory containing a filter is provided to the photographic lens unit, and the filter is retrieved from the lens memory by the DSP of the camera body at the time of mounting on the camera body, and the restoration processing is carried out on the image signal. Thereby, the same effect as the present embodiment may be obtained. Also, an identification signal for allowing determination on a type of the photographic lens unit may be stored in the lens memory. Accordingly, in a configuration where a plurality of filters corresponding to various photographic lens units are stored in an EEPROM of the camera body such that one of the filters is selected based on the identification signal retrieved from the lens memory, the same effect as the present embodiment may be obtained.

Further, although the present invention is applied to the photographic lens unit and the imaging apparatus, the present invention is applicable also to an imaging unit, i.e., an electronic endoscope having the photographic optical system, the image sensor, and the memory and outputting the image signal to the image processing apparatus for carrying out the deconvolution process.

REFERENCE SIGNS LIST 100 digital camera
101 image sensor
103 DSP
107 EEPROM
110, 110' photographic optical system
111 lens
112 aberration control surface
113 aberration control element

The invention claimed is:
1. An imaging apparatus comprising:
a photographic optical system having an aberration control element for generating a predetermined aberration, for forming an optical image;
an image sensor for generating an image signal corresponding to the optical image; and an image processing unit for carrying out, based on the predetermined aberration, image processing on the image signal in order to improve image characteristics having degraded due to the predetermined aberration, wherein the aberration control element sets a response of an optical transfer function to at least a predetermined subject distance in the photographic optical system to be zero at a first spatial frequency below Nyquist frequency of the image sensor and positions both a field distance of a maximum pupil height of a spherical aberration curve of the photographic optical system and a field distance of an inflection point proximate to the maximum pupil height on either a plus side or a minus side with respect to a field distance of the pupil height of zero.

2. The imaging apparatus according to claim 1, wherein the aberration control element improves a response of the optical transfer function in a first band having a second spatial frequency lower than a first spatial frequency as a maximum value to be better than a response of a reference optical transfer function larger than zero in a range from zero to the Nyquist frequency.

3. The imaging apparatus according to claim 2, wherein at a spatial frequency satisfying at least one of a spatial frequency smaller then a spatial frequency at which the response becomes zero to a first subject distance where the response of the optical transfer function becomes zero and a spatial frequency smaller than the Nyquist frequency with respect to subject distances other than the first subject distance, the aberration control element reduces the response of the optical transfer function in association with an increase in the spatial frequency.

4. The imaging apparatus according to claim 1, wherein the aberration control element provides the photographic optical system with characteristics having two peak positions of a subject distance optical transfer function at any frequency in a second band having a third spatial frequency less than the first spatial frequency as a maximum value.

5. The imaging apparatus according to claim 1, wherein the aberration control element moves the peak positions of the response of the subject distance optical transfer function based on the spatial frequency.

6. The imaging apparatus according to claim 5, wherein the aberration control element moves the peak positions of the subject distance optical transfer function further to a short distance side as the spatial frequency becomes lower.

7. The imaging apparatus according to claim 1, wherein the aberration control element includes a rotationally symmetrical surface.

8. A photographic lens unit removably attached to an imaging body including an image sensor for generating an image signal corresponding to an optical image formed on a light receiving plane and an image processing unit for carrying out image processing on the image signal, the photographic lens unit comprising:

a photographic optical system having an aberration control element for generating a predetermined aberration, for forming an optical image;

a memory for storing corresponding information that is at least one of information about the predetermined aberration and information associated with the predetermined aberration; and an output unit for outputting the corresponding information, wherein the aberration control element sets a response of an optical transfer function to at least a predetermined subject distance of the photographic optical system to be zero at a first spatial frequency below Nyquist frequency of the image sensor and positions both a field distance of a maximum pupil height of a spherical aberration curve of the photographic optical system and a field distance of an inflection point proximate to the maximum pupil height on either a plus side or a minus side with respect to a field distance of the pupil height of zero, and the image processing unit carries out the image processing on the image signal based on the predetermined aberration defined by the corresponding information in order to improve image characteristics having degraded due to the predetermined aberration.

9. An imaging unit removably attached to an image processing unit, comprising:

an image sensor for generating an image signal corresponding to an optical image formed on a light receiving surface;

a photographic optical system having an aberration control element for generating a predetermined aberration, for forming an optical image;

a memory for storing corresponding information that is at least one of information about the predetermined aberration and information associated with the predetermined aberration; and an output unit for outputting the corresponding information, wherein the aberration control element sets a response of an optical transfer function to at least a predetermined subject distance of the photographic optical system to be zero at a first spatial frequency below Nyquist frequency of the image sensor and positions both a field distance of a maximum pupil height of a spherical aberration curve of the photographic optical system and a field distance of an inflection point proximate to the maximum pupil height on either a plus side or a minus side with respect to a field distance of the pupil height of zero, and the image processing unit carries out the image processing on the image signal based on the predetermined aberration defined by the corresponding information in order to improve image characteristics having degraded due to the predetermined aberration.

* * * * *